W. C. ROFKAR.
FRUIT GRADING AND SIZING MACHINE.
APPLICATION FILED MAY 11, 1909.

1,042,037.

Patented Oct. 22, 1912.
3 SHEETS—SHEET 1.

Witnesses
A. R. Hardy
M. F. Miller

Inventor
William C Rofkar
By Chandler & Chandler
Attorney

W. C. ROFKAR.
FRUIT GRADING AND SIZING MACHINE.
APPLICATION FILED MAY 11, 1909.

1,042,037.

Patented Oct. 22, 1912.

3 SHEETS—SHEET 2.

Witnesses
C. R. Hardy
M. J. Miller

Inventor
William C Rofkar
By Chandler & Chandler
Attorney

W. C. ROFKAR.
FRUIT GRADING AND SIZING MACHINE.
APPLICATION FILED MAY 11, 1909.
1,042,037.
Patented Oct. 22, 1912.
3 SHEETS—SHEET 3.
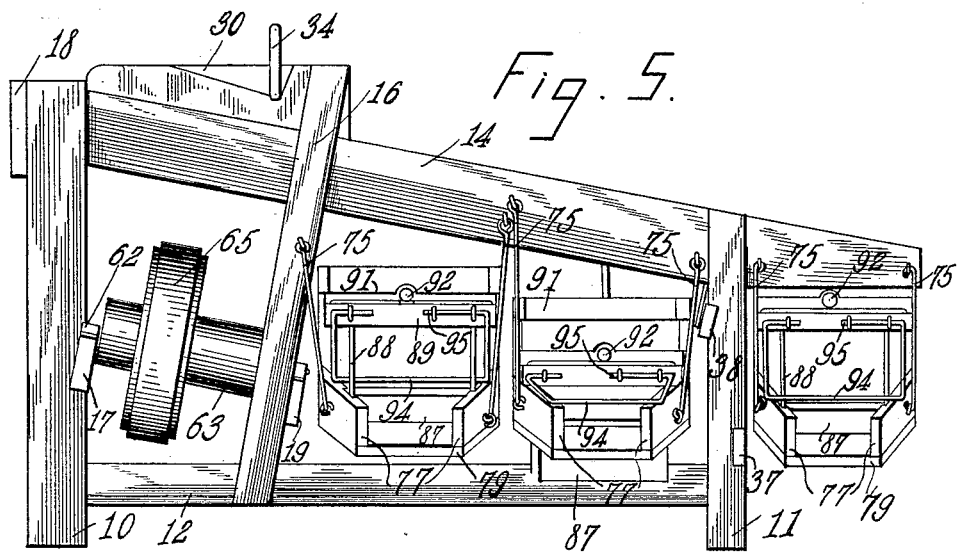
Fig. 5.
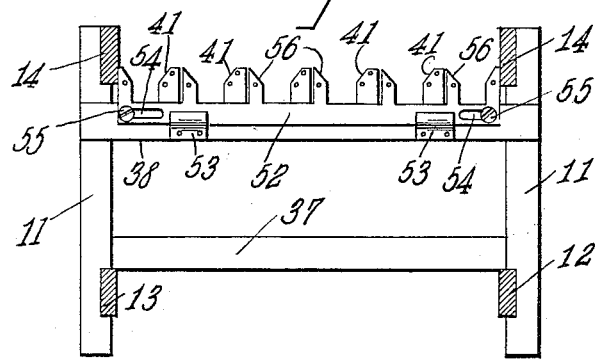
Fig. 4.
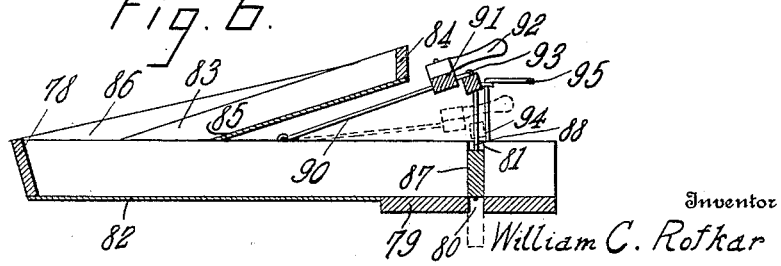
Fig. 6.
Inventor
William C. Rofkar
Witnesses
C. R. Hardy
M. T. Miller
By 
Attorney
COLUMBIA PLANOGRAPH CO., WASHINGTON, D. C.

UNITED STATES PATENT OFFICE.

WILLIAM C. ROFKAR, OF PORT CLINTON, OHIO.

FRUIT GRADING AND SIZING MACHINE.

1,042,037. Specification of Letters Patent. Patented Oct. 22, 1912.

Application filed May 11, 1909. Serial No. 495,322.

*To all whom it may concern:*

Be it known that I, WILLIAM C. ROFKAR, a citizen of the United States, residing at Port Clinton, in the county of Ottawa, State of Ohio, have invented certain new and useful Improvements in Fruit Grading and Sizing Machines; and I do hereby declare the following to be a full, clear, and exact description of the invention, such as will enable others skilled in the art to which it appertains to make and use the same.

This invention relates to devices for grading and sorting fruit such as are commonly known as fruit graders.

The principal object of the invention is to provide an improved general structure whereby a large quantity of fruit may be readily graded and assorted according to size.

Another object of the invention is to provide an adjustment of certain of the parts whereby the grading may be accomplished in an improved manner.

A third object of the invention is to provide an improved arrangement of grading rolls in such a machine.

A fourth object of the invention is to provide an improved form of receiving tray and gate therefor.

A fifth object of the invention is to provide an improved form of drive for the grading rolls.

With the above and other objects in view, the invention consists, in general, of a device of the character described provided at its upper end with a delivery tray leading to a grading frame, and receiving trays below the grading frame together with an improved form of guiding rolls and drive therefor.

The invention further consists in certain novel details of construction and combinations of parts hereinafter fully described, illustrated in the accompanying drawings, and specifically set forth in the claims.

Figure 1:
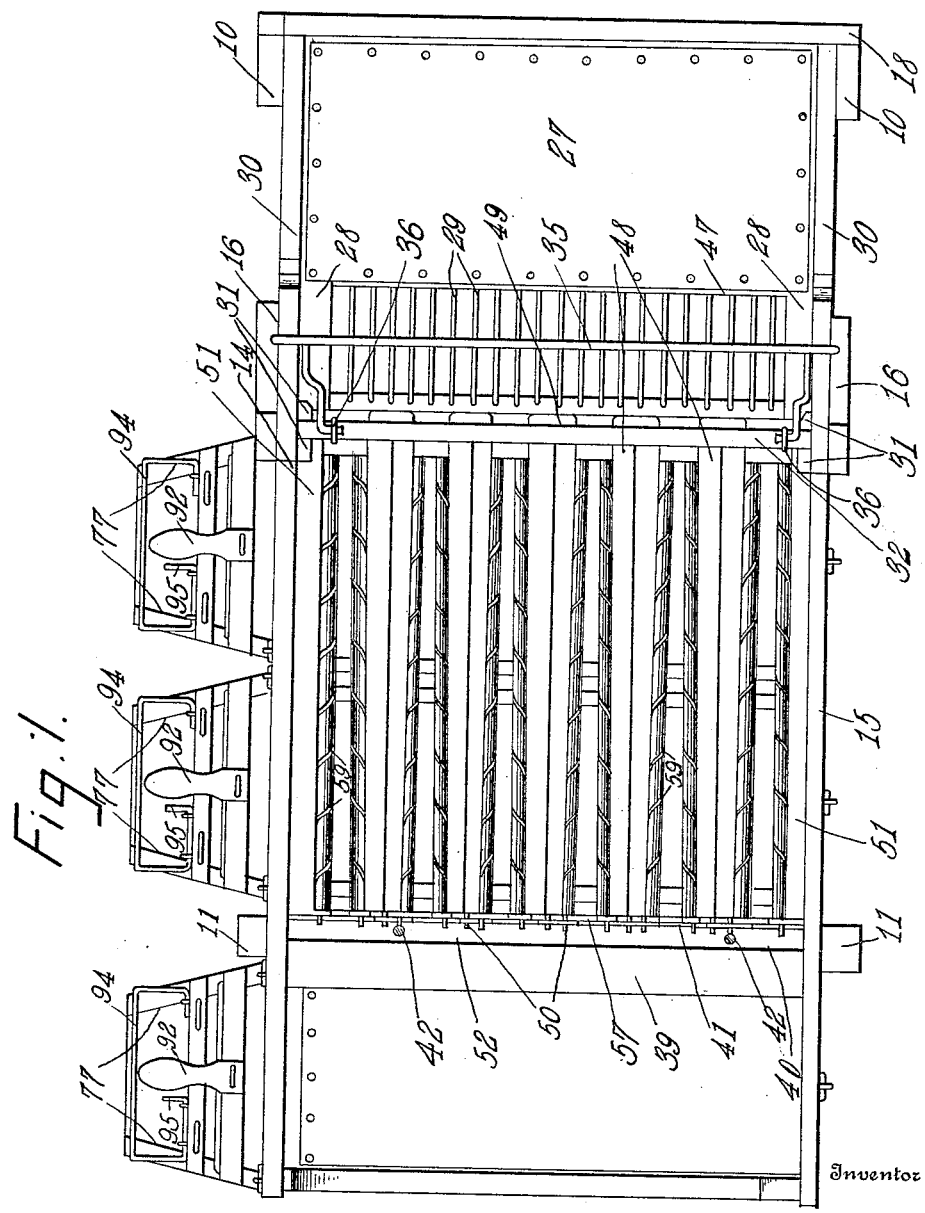
Figure 2:
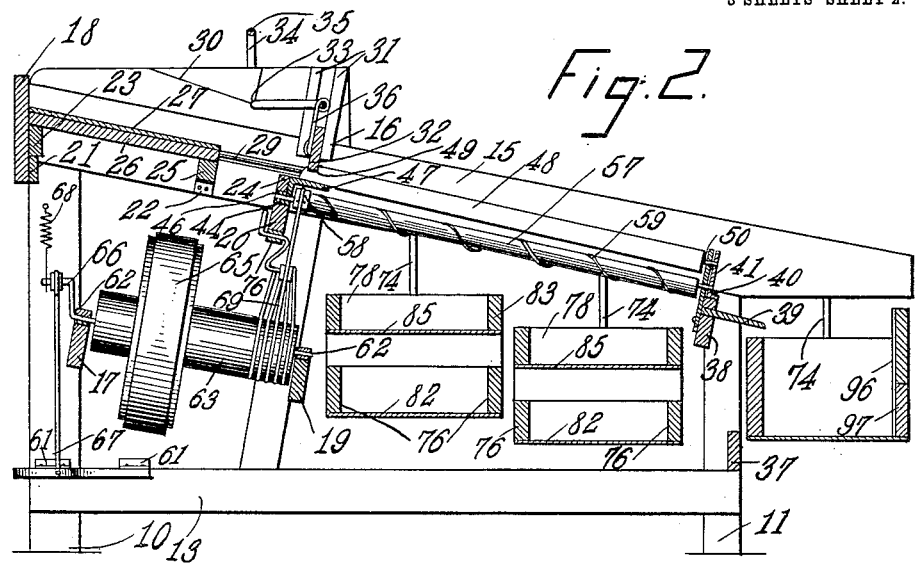
Figure 3:
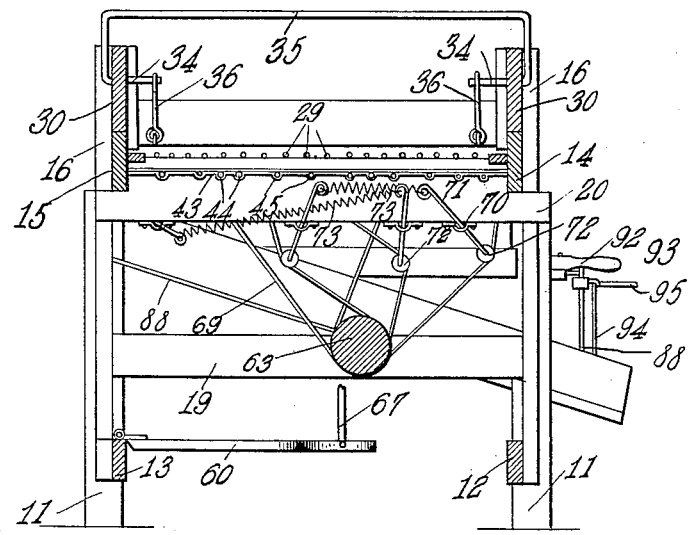

In the accompanying drawings, like characters of reference indicate like parts in the several views, and Figure 1 is a top plan view of a fruit grader constructed in accordance with this invention. Fig. 2 is a median longitudinal section through such a grader. Fig. 3 is a transverse section through the trash screen and drive mechanism of such a grader. Fig. 4 is a transverse section to show the adjusting bar. Fig. 5 is a side elevation of such a grader. Fig. 6 is a section through one of the receiving trays to show the gate mechanism, the gate being shown closed in full lines and open in dotted lines.

The numerals 10 indicate the rear legs of the machine and the numerals 11 the front legs thereof. The rear and front legs are connected on one side by a longitudinal bottom member 12 and on the opposite side by a similar bottom member 13. There is also provided above the member 12 an upper member 14 downwardly inclined toward the front end of the machine and forming the side of the grading tray. Above the member 13 a similar side member is provided as indicated at 15. From a point between the legs 10 and 11 there extends upwardly at right angles to the members 14 and 15 a pair of braces 16 one being on each side of the machine. A transverse member 17 connects the two legs 10 at a point about midway their height and an upper transverse member 18 connects these legs at their upper ends and forms the back wall of the delivery tray presently to be described. A transverse member 19 connects the braces 16 about midway their height and a similar transverse member 20 connects these braces immediately below the members 14 and 15. The transverse member 18 is provided on its inner side near the bottom with a rib 21 extending entirely across the member between the legs 10 and brackets 22 are also provided on the inside of the members 14 and 15.

The bottom of the delivery tray is provided with a transverse member 23 at the rear end thereof and this member is adapted to rest on the member 21 when the bottom is in position. A similar transverse member 24 is provided at the front end of the delivery tray bottom and this member is disposed directly above and spaced from the transverse member 20. A still further transverse member 25 is provided for this tray bottom and the ends of this member rest on the brackets 22. Between the members 23 and 25 the bottom of the tray is formed solid being preferably made of wood, as indicated at 26 and padded on top with a suitable canvas padding as indicated at 27. The sides of the tray bottom are extended as at 28 and are attached to the front member 24 and extending from this front member to the member 25 are a plurality of sifter bars 29 arranged to form a screen through which leaves, stems and other trash may pass. It will be seen from this construction that the tray bottom may readily be removed for the purpose of cleaning the same or substituting a bottom having a screen of different sized openings.

The sides of the delivery tray are extended upward above the members 14 and 15 as indicated at 30 and these extensions are provided with suitable guide pieces 31 wherein slides a gate 32 extending entirely across the front of the delivery tray. Mounted in suitable bearings 33 is a rock shaft 34 provided with a hand bar 35 which extends entirely across the width of the machine. The ends of the rock shaft 34 are connected to the gate 32 by means of links 36 which are pivoted to the rock shaft arm at one end and secured to said gate at the other end.

From the foregoing and by reference to Fig. 2 of the drawings it will be seen that pulling upon the hand bar 35 and depressing the same will cause the gate to rise while lifting said bar will allow the gate to fall across the front end of the delivery tray and prevent the fruit from leaving said tray.

The front legs are provided with a lower transverse brace member 37 and also with an upper transverse brace member 38, the latter lying slightly below the side members 14 and 15. Between the legs 11 and substantially in alinement with the upper transverse brace member 38 is a delivery lip 39. Mounted upon the brace member 38 is a metallic strip 40 provided with a plurality of spaced and upturned ears 41, this strip 40 being rigidly secured to the brace member 38 by means of suitable screws 42. Upon the brace member 20 is arranged a bottom bearing plate 43 which is provided with a series of depressions 44 arranged to enter seats 45 in the upper face of the member 20. There is further provided a cover plate 46 arranged to cover all of these bearings 44. This bearing plate 43 and cover plate 46 are arranged between the braces 20 and 24 above mentioned. Resting on the cover plate just described is an L-shaped bar 47, the short leg of the L bearing against the brace 24 and the longitudinal end thereof resting on the said cover plate, while the longer leg of the L supports a plurality of spaced parallel bars 48 of inverted V-shape tapered from end to end and provided at their upper ends with cut away portions 49 adapted to receive the lower edge of the gate 32 when the same is closed. These bars are each provided at their lower ends with a pin 50 which enters a suitable perforation in one of the ears 41. The bars 48 are further arranged so as to taper slightly from the upper to the lower end. At each side of the frame thus formed there is rigidly attached to the members 14 and 15 a similar bar 51 with the difference that this bar is made like a half of one of the other bars so that its surface is anticlinally arranged with reference to the adjacent surface of the nearest bar 48.

Mounted on the transverse brace 38 is a sliding bar 52 held to move in suitable brackets 53. This bar is provided at each end with a slot 54 and screws 55 extend through these slots into the member 38 to limit the movement of the bar. This bar is also provided with a plurality of spaced and upstanding ears 56. Carried between the member 20 and the member 38 and supported at one end in the bearings 45 and at the other end in suitable perforations made in the ears 56 and 41 are a plurality of grading rollers 57 arranged in pairs and each is provided at its upper end with a cord pulley 58. These rollers are each further provided with a spirally arranged rib 59, the rib on one of each pair of rollers being oppositely disposed to the rib on the other roller of that pair. It will now be obvious that by moving the sliding bar 52 the lower ends of each pair of rollers may be brought nearer to or farther from each other according to the requirements of the grading. If, now, these rollers be rotated, the rollers of each pair being rotated in opposite directions, and fruit be allowed to move out from the delivery tray by raising the gate 32, that fruit will run down between the bars 48 and over the rollers 57. It is intended that the spiral rib 59 shall be rotated in such direction as to tend to carry the fruit toward the upper end of these inclined rollers but at the same time the dimensions of this will be small enough to permit the fruit to tumble about and pass down said rollers. As the fruit thus passes along the rollers certain sizes will fall through the rollers at the upper end, other sizes toward the lower end, and still others will pass over the lip 39, being carried along the entire length of the rollers. By means of this arrangement of the L-shaped bar 47 just described, the longer member of the L projects over the ends of the rollers 57 and serves to cover the cord pulleys 58 carried at the upper ends of these rollers.

In order to drive the rollers 57, there is provided at the rear of the machine a treadle 60 hinged to the lower side member 13 as at 61. Mounted in suitable bearings 62 on the members 17 and 19 is a drum 63 provided with a plurality of cord grooves 64 and having a fly wheel 65 carried thereon. This drum terminates in a crank shaft 66 which is connected to the treadle 60 by means of a link 67. A spring 68 is also attached to the end of the crank shaft and extends to the side member 10 for the purpose of drawing the crank up after the same has been depressed by the treadle.

Suitable cords 69 extend around the cord grooves 64 and are carried over the pulleys 58, these cords being so arranged as to revolve the rolls in opposite directions.

In order to provide for constant tension being made on these cords a number of bearings 70 are mounted on the bottom of the member 20 and on each of these bearings there is supported a rock shaft 71 which carries on one arm a tension roller 72. The other arms of these rock shafts are connected in pairs by means of suitable springs 73. The cords 69 before referred to are each led over one of the tension rollers 72 in such manner as to keep the cord constantly under tension as shown.

Suspended by means of a suitable link 74 from the member 15 and a pair of links 75 from the member 14 are a series of receiving trays. In the form here shown, two of these trays are located beneath the grading rollers and each of the trays in this position comprises a pair of side members which are parallel throughout a portion of their length as indicated at 76 and are then inclined toward each other to form a delivery mouth as indicated at 77. The links 75 are longer than the links 74 and these side members are consequently inclined downwardly toward the mouth or delivery end. A back member 78 connects these side members at the upper end and lies in a substantially vertical position. Across the lower or front end of these side members is a bottom 79 provided with a slotted opening therethrough as indicated at 80. Extending upward from the slotted opening 80 and formed in the forward portions 77 of the side members are guide grooves 81. The remainder of the bottom is formed by means of a fabric 82 secured to the side members 74, bottom 79 and rear members 78.

In order to prevent the fruit dropping too great a distance an auxiliary catching frame is provided which has side members 83 extending upward from the members 74 and a rear member 84. A fabric bottom 85 is attached to these side members. In order to prevent the fruit from falling over what may be termed the front side of these trays there is provided an extension side 86 so arranged that its upper edge is substantially horizontal and closing in the space between the upper end of the member 83 and the member 76 to which it is applied.

In order to retain the fruit within the delivery chute until such time as it may be desired to remove the same there is provided a gate 87 which is arranged to move through the opening 80 in the guide slots 81. This gate is provided at each end with a supporting bar 88 the upper end of which is connected to a cross bar 89 and these supporting bars are of such length that when the cross bar 89 rests upon the top of the members 77 the top of the gate 87 will be flush with the bottom 79 so that the fruit tray be rolled out in an unobstructed manner. In order to raise this gate there is provided a U shaped link 90 which is pivoted to the side members 74 at the ends of the U and which carries upon the bottom of the U a cross member 91 whereon is mounted a handle 92. This U-shaped member is connected to the cross bar 89 by means of a suitable connection 93. In order to hold the gate in the raised position there is provided a second U-shaped member 94 which is pivotally mounted on the member 89. The sides of this member are of such length as to hold the gate fully raised when the bottom of the member is swung down into contact with the side members 77. In order to raise this member there is provided a lever handle 95 which lies adjacent the handle 92 so that the one hand may grip both the lever 92 and the lever handle 95 to rotate the U-shaped member 94 and permit the gate to fall.

It will be observed that the method of suspension of these receiving trays is such that they may be shaken by the handle and the fruit caused to deliver down through the narrow or delivery end.

Another tray similar in character to the above mentioned tray and similarly suspended is held beyond the delivery lip 39 but this tray has the supplementary side member 83 and the attached parts omitted. In place thereof there is a supplementary side member 96 and the inner side of this side member and the side member 76 of this last mentioned tray are covered with a padding as indicated at 97 to prevent the bruising of the fruit as it falls over the delivery lip 39.

In the complete operation of the device the fruit is placed as previously described and the gate 32 opened. By working the treadle 60 the grading rolls are caused to revolve and as the fruit passes down these rolls it falls into one or the other of the receiving trays just described. The gates for these trays are kept shut until such time as a sufficient quantity of fruit may have accumulated in one or the other of the trays. When this takes place, a receptacle of any convenient sort such as a barrel or the like is placed beneath the mouth end of the receiving tray and the gate opened. If the fruit does not feed properly down the tray the handle 92 is grasped and the feed agitated to cause the fruit to roll down. When the fruit has been taken from one tray the gate is closed ready for the reception of more fruit and the other trays treated in like manner. It can thus be seen that the operation of grading fruit may, by the use of this apparatus, be carried out in a continuous manner and that the device forms a simple and efficient mechanism of the character described and for the purpose specified.

It is obvious that minor changes may be made in the form and construction of this invention without departing from the material principles thereof and it is not therefore desired to confine the same to the exact form herein shown and described, but it is wished to include all such as properly come within the scope thereof.

Having thus described the invention, what is claimed as new, is:—

In a fruit grader, a frame including front and rear transverse braces, the front brace being provided with a plurality of seats, a bearing plate supported by the said front brace and provided with a series of depressions arranged within the seats of the said braces, a bearing plate fixedly supported by the rear brace and provided with a plurality of spaced and upturned ears, each ear being provided with a plurality of openings, a second bearing plate mounted on the said rear brace for longitudinal adjustment and provided with a plurality of spaced and upturned ears, each ear being provided with an opening, pairs of grading rolls, each pair having their front ends journaled in the said depressions of the first mentioned bearing plate, and the rear end of one roll of each pair being journaled in an opening of an ear of the fixed bearing plate and the rear end of the other roll of each pair being journaled in the opening of the ear of the movable bearing plate, means to revolve said rolls, a delivery tray at the front end of said rolls, and a receiving tray mounted below said rolls.

In testimony whereof, I affix my signature, in presence of two witnesses.

WILLIAM C. ROFKAR.

Witnesses:
RACHEL A. CAUGNEY,
WEST ROGERS.

---

Copies of this patent may be obtained for five cents each, by addressing the "Commissioner of Patents, Washington, D. C."